Sept. 18, 1934.  O. P. M. GOSS ET AL  1,973,757
WOODWORKING MACHINE
Filed May 24, 1933   3 Sheets-Sheet 1
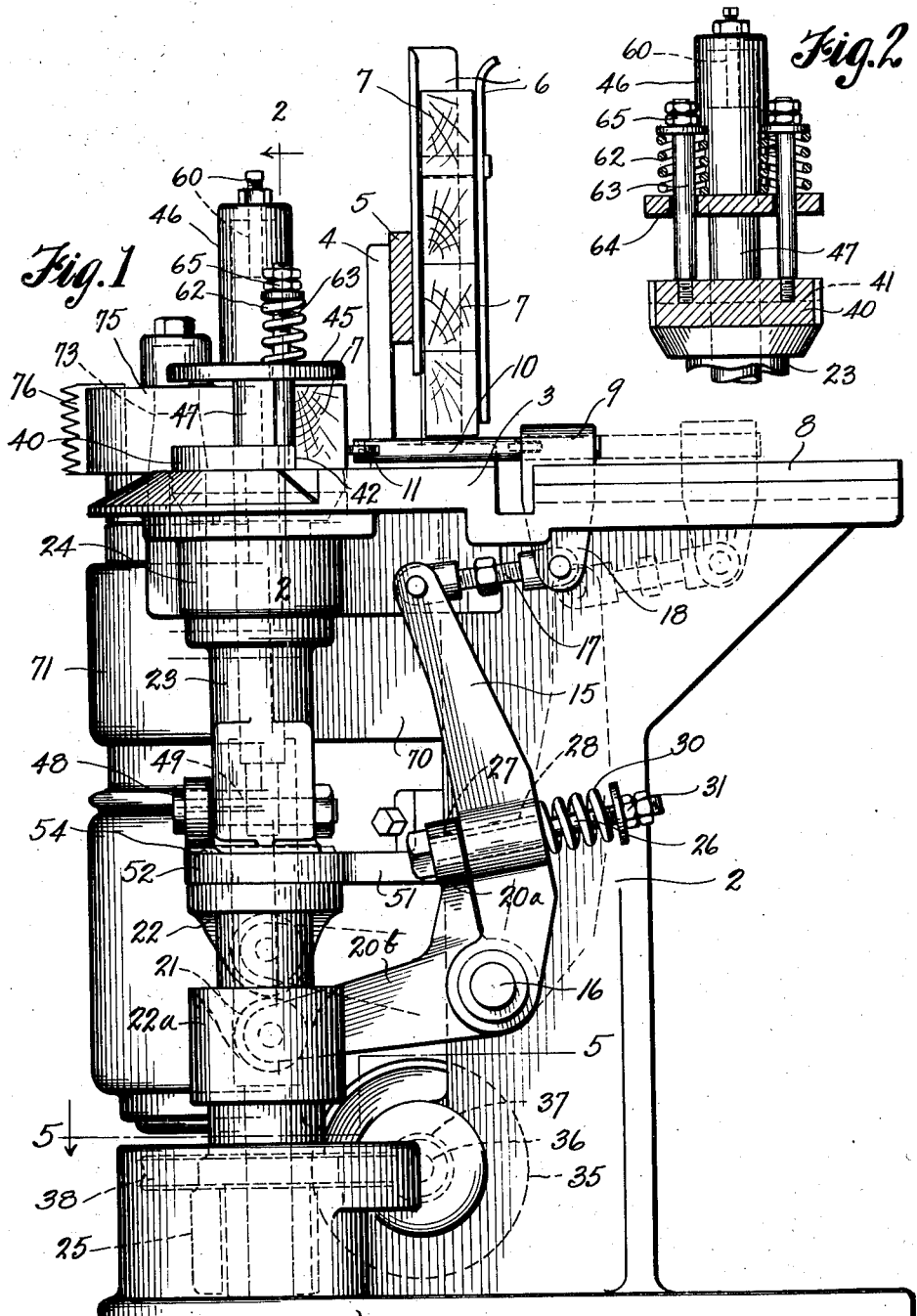
INVENTORS
OLIVER P. M. GOSS
WORTH C. GOSS
BY
Cook + Robinson
ATTORNEY Sept. 18, 1934.  O. P. M. GOSS ET AL  1,973,757
WOODWORKING MACHINE
Filed May 24, 1933  3 Sheets-Sheet 2
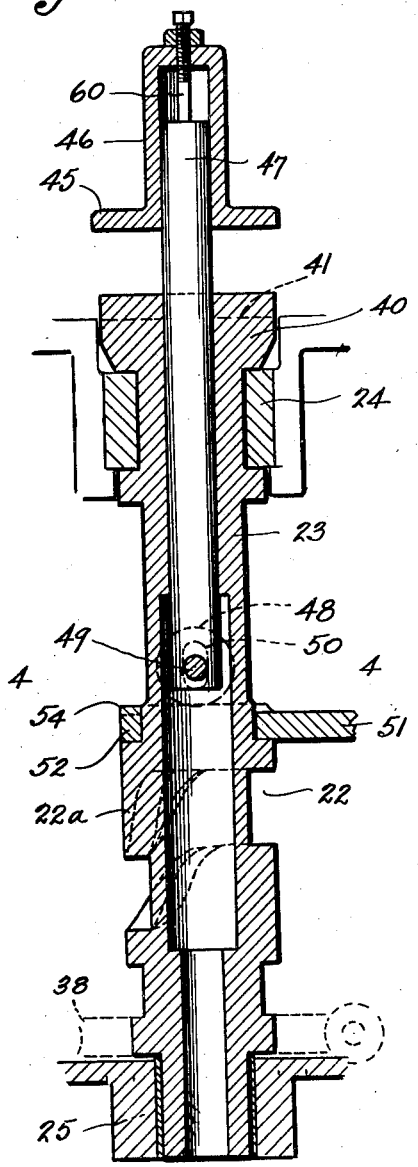
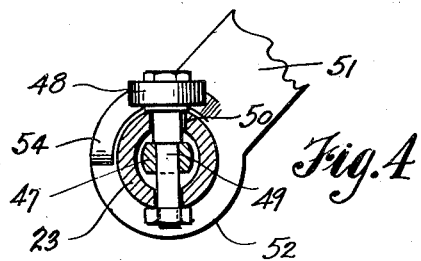
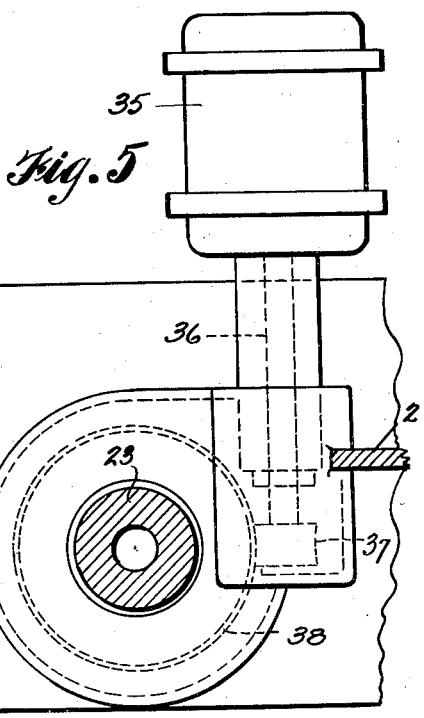
INVENTORS
OLIVER P. M. GOSS
WORTH C. GOSS
BY
Cook + Robinson
ATTORNEY Sept. 18, 1934.   O. P. M. GOSS ET AL   1,973,757
WOODWORKING MACHINE
Filed May 24, 1933   3 Sheets-Sheet 3
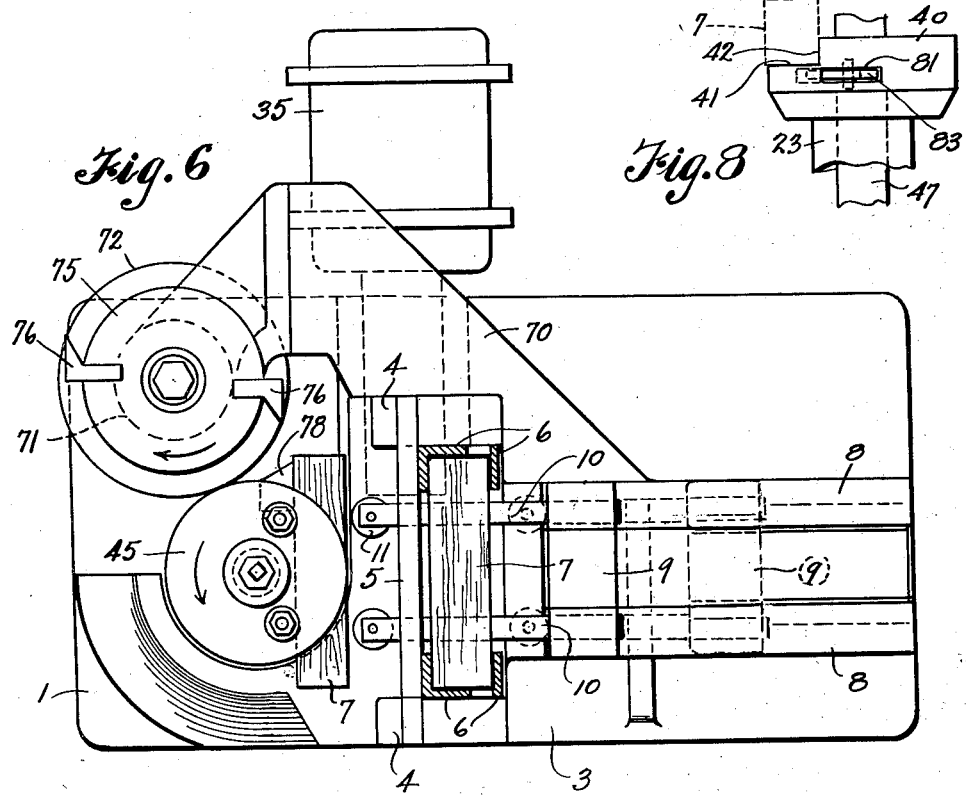
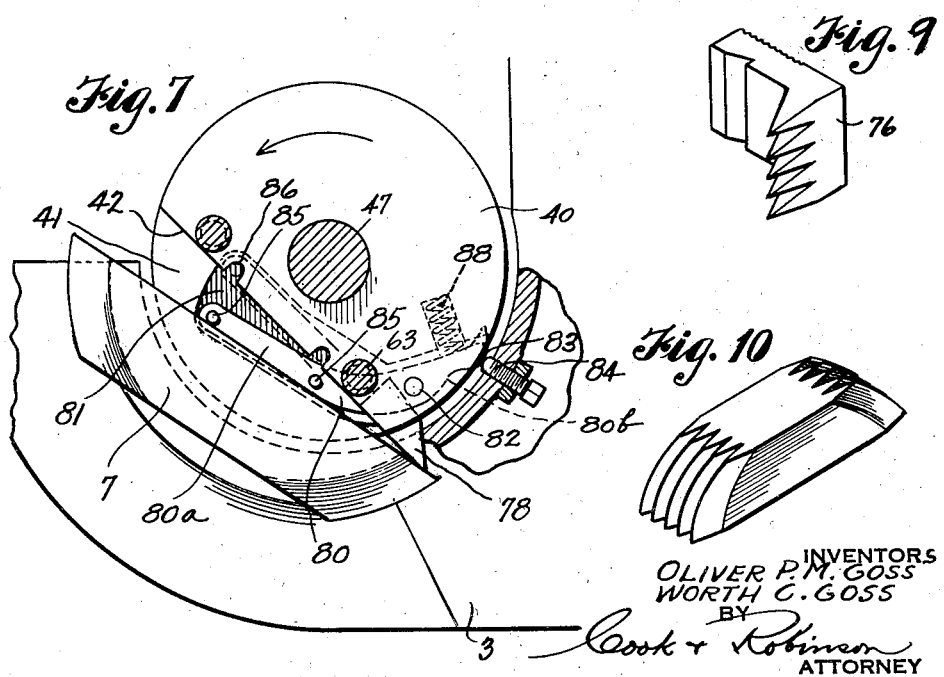
INVENTORS
OLIVER P. M. GOSS
WORTH C. GOSS
BY
Cook & Robinson
ATTORNEY Patented Sept. 18, 1934

1,973,757

UNITED STATES PATENT OFFICE 1,973,757

WOODWORKING MACHINE

Oliver P. M. Goss and Worth C. Goss, Seattle, Wash., assignors to Carlisle Lumber Company, a corporation of Washington Application May 24, 1933, Serial No. 672,726

3 Claims. (Cl. 144—2)

This invention relates to wood working machines and it has reference more particularly to a machine that is designed especially for the manufacture of wooden patch pieces to be used in the manufacture of lumber in accordance with the disclosures and objects of our co-pending application filed April 21, 1933, under Serial No. 667,219.

Explanatory to the present invention, it will be here stated that the above mentioned pending application refers to the manufacture of lumber and it contemplates the cutting out from the lumber of all objectionable parts, or defects, such as knots, pitch pockets, scars, stains, etc., by means of a rotating router or cutter which in removing these defects forms elongated pockets through the lumber piece of uniform size and of novel structure designed to receive therein wooden patch pieces whereby the lumber, insofar as its grade, resistance and strength is concerned, is materially improved and its value increased accordingly.

It has been the principal object of the present invention to provide a simple and relatively inexpensive machine for the automatic manufacture of wooden patch pieces for use in the improvement of lumber in accordance with the objects of the co-pending application.

It is also an object of this invention to provide a machine whereby all patches are made of uniform length and with end surfaces of a specific form for fitting into the pockets formed in the lumber pieces by another machine, as described in application filed by us.

More specifically stated the present invention resides in the provision of a patch making machine comprising a continuously rotating cutter head, a storage hopper for lumber pieces from which patches are to be made, a rotary carrier for presenting the wooden pieces successively to the cutter head for shaping thereby and means operating in timing with the rotary carrier for feeding the wooden pieces from the hopper individually to the carrier.

It is also an object of the invention to provide for an automatic ejection of the finished pieces from the carrier after they have been presented to the cutter and properly shaped thereby.

Other objects of the invention reside in the improved details of construction of the various parts, in their combination and mode of operation.

In accomplishing these and other objects, we have provided the improved details of construction, the preferred forms of which are illustrated in the accompanying drawings, wherein—

Fig. 1 is a side elevation of a machine embodying the present invention.

Fig. 2 is a sectional detail substantially on the line 2—2 in Fig. 1, showing the spring pressed clamp plate whereby the patch pieces are held on the carrier for presentation to the cutter head.

Fig. 3 is a longitudinal, sectional view of the carrier turret shaft, and clamp plate actuating shaft.

Fig. 4 is a horizontal, sectional view on line 4—4 in Fig. 1.

Fig. 5 is a horizontal section on line 5—5 in Fig. 1.

Fig. 6 is a top, or plan view, of the machine.

Fig. 7 is an enlarged plan view of the carrier turret in ejecting position and illustrating the block ejection devices associated therewith.

Fig. 8 is a side elevation of the carrier.

Fig. 9 is a perspective view of one of the cutters removed from the cutter head.

Fig. 10 is a perspective view of one of the patch pieces made by the machine.

Referring more in detail to the drawings—

In its preferred form of construction the present machine comprises a main frame structure consisting of a horizontal base flange 1 mounting an upright standard 2 on which is an integrally cast bed plate 3; the latter being horizontally disposed and located at a convenient working height.

Fixed upon the bed plate 3 are spaced brackets 4—4, connected across their upper ends by a plate 5 by means of which vertical guides 6—6 of channel form fixed thereto are supported in a position facing each other so that together they will form a vertical hopper for containing wooden blocks 7 in stacked relation and adapted to feed downwardly in the hopper by gravity.

Formed in the bed plate at one side of the hopper, are two parallel guides 8—8 slidably mounting therein a cross head 9 adapted for reciprocal movement toward and from the hopper. Extended from the cross head are two spaced parallel rods 10—10 with exposed rollers 11—11 at the ends adapted upon each forward reciprocal action of the cross head to be brought simultaneously into engagement with the lower block 7 in the hopper, thereby to advance it therefrom, as seen in Fig. 1, onto the rotating carrier for presentation thereby to the cutter head; the carrier and cutter head later being fully described.

The cross head 9 is reciprocally moved by the action of a rocker lever 15 that is pivotally mounted at its lower end on a pivot pin 16 that is fixed in the standard 2 and at its upper end, is operatively connected through the mediacy of an adjustable link 17 with a downwardly extending lug 18 centrally on the underside of the cross head. The lever 15, in turn, is actuated by an oscillating bell crank lever 20 that also is pivotally mounted on the pin 16 with one arm, 20a, extended along the inner side of lever 15 and its other arm, 20b, mounting a cam roller 21 at its swinging end arranged to follow within a cam slot 22 formed in a barrel portion 22a of a rotating shaft or post 23 that is mounted vertically in the frame and which is supported at upper and lower ends, respectively, in bearings 24 and 25, as disclosed best in Figs. 1 and 3. A yieldable means joins the bell crank lever arm 20a with the lever 15 so that normally they will operate in unison, but in the event of a jam, the connection will yield, as a safety measure. The connection, as seen best in Fig. 1, comprises a bolt 26 extending through alined openings 27—28 in the levers. A head 29 on one end of the bolt engages the lever 20a and a coiled spring 30 located about opposite ends of the bolt bears against lever arm 15 and against a retaining nut 31 at the outer end of the bolt. It is to be understood that in the event of a jam occurring during inward travel of the reciprocating head the spring 30 will yield and will thus prevent damage to the machine by reason of the jam.

The vertical shaft 23 is rotatably driven by an electric motor 35 supported from the main frame and which has its shaft 36 equipped with a gear 37 at its end in driving mesh with a larger gear 38 that is keyed on the lower end of the shaft 23.

At its upper end the shaft 23 is formed with a circular head or turret 40 having a segment cut away at one side of the center to form flat supporting surface 41 and a shoulder 42, as seen in Fig. 8; the base surface 41 being flush with the top surface of the bed plate 3 so that, assuming the turret to be in proper position relative to the hopper, a wooden block 7 may be advanced by the feed mechanism from the hopper and positioned upon the base 41 and pressed flatly against the shoulder, as illustrated in Fig. 1, as the turret or carrier rotates.

Since the carrier turret 40 and the barrel cam 22a are both cast integrally with the vertical shaft 23, they retain their relationship and the block feeding mechanism actuated by the cam through the levers 20 and 15 retains its timing. The parts are so arranged that, as the blocks 7 are moved inwardly by the feed mechanism, they will be placed on the base 41 and brought flatly against the shoulder 42 just as the feed slide starts on its outward movement, and the slide moves outwardly with sufficient speed that the rollers 11 will keep clear of the block as it rotates with the carrier.

As the blocks are passed to the turret and seated against the shoulder 42, they are clamped securely in position by a clamp disk 45 which is spaced above the turret and which is formed with a hollow hub portion 46 whereby it is slidably mounted upon the upper end of a shaft 47 which is mounted co-axially within the shaft 23 and extends upwardly therefrom through and beyond the turret as in Fig. 3. The shaft 47 is slidably contained within the shaft 23 and is adapted to be moved upwardly and downwardly therein by action of the cam roller 48 mounted on a pin 49 fixed transversely within the lower end of the shaft 43 and also extended through vertical slots 50 in the shaft 23, thereby to cause the cam roller to rotate about the axis of shaft 23.

A bracket 51 is fixed to the standard 2 of the frame and this has a collar portion 52 encircling the shaft 23 and this collar is formed with an arcuate cam surface 54 upon which the cam roller 48 may ride as the shaft 23 revolves for the purpose of raising and lowering shaft 47 and thereby to lift and lower the clamping disk 45 in timing with rotation of the shaft 23. The rise of the cam is so located that the disk is thereby lifted for reception of a wooden block as advanced by the feed slide and then after the reception of the block, is lowered so that the disk will clamp and secure the block in place as shown in Fig. 6. The lifting of the disk 45 by shaft 47 is effected through the mediacy of an adjustable bolt 60 threaded downwardly through the upper end of the hub portion 46 of the disk and extended downwardly and adapted to be engaged by the upper end of shaft 47 as the latter moves upwardly to lift the disk free of the clamped block. When shaft 43 moves downwardly, after a new block has been fed into position, the disk is lowered and clamped tightly against the block. The clamping means consists of two coiled springs 62 which are mounted upon the upper ends of the post 63 fixed in the turret and extended upwardly through openings 64 in the disk; the spring being retained by nuts 65 threaded onto the posts, and they bear downwardly against the disk. The setting of the bolt 60 determines the lift of the disk.

Supported from the main frame is a laterally extending bracket 70 formed at its end with a bearing portion 71 which supports an electric motor 72. The motor is vertically disposed and its shaft 73 extends parallel with the shaft 23. At its upper end the motor shaft mounts cutter head 75 and the cutter head mounts one or more cutters 76 as disclosed best in Fig. 9. This cutter head is accurately located for cutting off the ends of the block 7 as presented thereto by the rotation of the carrier turret 40. It will be understood by reference to Fig. 6 that, with the cutter head rotating at high speed in the direction indicated by the arrow thereon, and the carrier rotated at relatively low speed in the direction likewise indicated, the opposite ends of the blocks 7 will successively be presented to the path of travel of the cutters of the rotating head and will be rounded off by the cutters, as seen in Fig. 7, and the block, in finished form will have the appearance as illustrated in Fig. 10.

It is to be understood that the cutters 76 may have various shapes but that of Fig. 9 is of a type especially suited to the manufacture of lumber according to the objects of the copending application previously referred to.

To prevent the possibility of the wooden piece 7 being damaged by reason of splintering of the wood incident to rotation of the cutters 76 against the grain of the piece, a chip breaker 78 is fixed in the cutter head flush with the plane of the shoulder 42, as seen in Figs. 6 and 7, to serve as a supporting base for the end of the wooden piece. This chip breaker would be of a serrated form for permitting passage of the teeth of cutters 76 therethrough.

After the head 40 has carried a wooden block past the cutter head, and the two ends of the block have been rounded off, the block is then mechanically ejected, by means of devices best illustrated in Fig. 7, wherein 80 designates a lever that is contained in a cored out recess 81 in the head.

This lever is pivoted, at 82, and has one end 80a extended below the block 7 and its other 80b formed with a cam end surface 83 normally exposed beyond the periphery of the head 40 for contacting a set screw 84 fixed in the frame structure. On the arm 80a are upright pins 85, disposed in recesses 86 in the shoulder 42 just back of the block. When the carrier head 40 has rotated to the discharge position, the cam end 83 of the lever then engages the set screw 84 and rocks the lever to the position of Fig. 7, thereby throwing the block from the head. The lever is instantly reset by means of a coiled spring 88 contained in the head and acting against the arm 80b.

Assuming the parts to be so constructed, operation of the machine, briefly, is as follows:

The wooden pieces 7, cut to definite size, are stacked in the hopper. Then, incident to rotation of the shaft 23 through its geared connection with motor 35, the feed head is reciprocally actuated and this delivers the wooden blocks successively to the carrier head 40.

As each block is presented to the carrier, it is received on the surface 41 and against shoulder 42, and is instantly clamped in position by the disk 45. As the block is carried rotatably about with the disk, the feed devices retract to a position beyond the hopper. Rotation of the carrier presents opposite ends of the block to the path of the cutters of the rotating cutter head and they are thereby rounded off as illustrated in Fig. 7. The block, on reaching the discharge position, is released by reason of the clamp disk being lifted when the cam roller 48 rides up onto the cam surface 54, then the ejector lever 80 operates to eject the block from the head. The clamp disk is held on this elevated position until the next block has been passed thereto by the feed devices.

The machine as thus described is fully automatic, simple in its operation and will economically perform its intended purpose.

Having thus described our invention, what we claim as new therein and desire to secure by Letters Patent is—

1. A machine of the character described, comprising a frame structure, a rotatably driven cutter head supported thereby, a shaft rotatably mounted in the frame, a carrier turret fixed thereon adjacent the cutter head, means for rotatably driving said shaft, a storage hopper for wooden pieces of material, a feed device for advancing pieces of material from the hopper, successively, to the carrier, a cam on said shaft, means actuated by the cam for operating the feed device in timing with rotation of the carrier, clamping means on the carrier for engaging the pieces as delivered thereto for presenting their opposite end portions to the cutter head, a stationary cam, a push rod coaxially contained within the driven shaft and rotated thereby and a follower on the rod engaging the stationary cam for lifting the push rod against the clamp to release the latter from the piece held thereby.

2. A machine of the character described comprising a continuously rotating cutter head, a continuously rotating turret adjacent thereto having an abutment shoulder thereacross, a feed device operating in timing with the rotations of the turret for feeding pieces in succession to the turret as it rotates and including a yieldable member whereby said pieces are disposed flatly against the said abutment shoulder, a clamp plate mounted on the turret and overlying the shoulder, yieldable means for actuating the plate against the pieces as delivered to the turret to hold them securely for presenting their opposite ends to the cutter head, and means for raising the clamp plate to permit ejection of the piece after it has been acted on by the cutter head and means within the turret and operable for effecting the positive ejection of the piece when released by the clamp plate.

3. In a machine of the character described, a rotating cutter head, a rotatably driven shaft axially parallel thereto, a turret on said shaft, having an abutment shoulder across the top thereof at one side of the center, a feed device operating in timing with rotations of the turret for feeding wooden pieces successively to the turret and for disposing them flatly against the said shoulder with ends projecting from the turret, a clamp disk overlying the turret, guide rods for the disk fixed in the turret, coiled springs on the rods bearing against the disk to clamp it against pieces delivered to the turret, a push rod axially contained in the turret shaft, with its upper end engaging the clamp disk, a cam roller on the lower end of said rod, and a cam surface for the roller for actuating the rod to lift the disk for ejection of the wooden pieces from the turret and for reception of pieces to be presented to the cutter head, an abutment adjacent the turret and an ejection lever on the turret with an end extended to engage with the abutment to actuate the lever.

OLIVER P. M. GOSS.
WORTH C. GOSS.